United States Patent [19]

Coutin

[11] 4,395,003
[45] Jul. 26, 1983

[54] DEVICE FOR SUSPENDING UNDER AIRCRAFT MISCELLANEOUS LOADS WITH VARIABLE DISTANCE BETWEEN CENTERS

[75] Inventor: Pierre F. Coutin, Paris, France

[73] Assignee: R. Alkan & Cie, France

[21] Appl. No.: 272,845

[22] Filed: Jun. 12, 1981

[30] Foreign Application Priority Data

Jun. 13, 1980 [FR] France .................. 80 13252

[51] Int. Cl.³ .............................. B64D 1/02
[52] U.S. Cl. .................. 244/137 R; 89/1.5 B; 89/1.5 H
[58] Field of Search .......... 244/137 A; 89/1.5 R, 89/1.5 B, 1.5 C, 1.5 F, 1.5 G, 1.5 H; 294/83 R, 83 AE, 83 AB

[56] References Cited

U.S. PATENT DOCUMENTS

| 2,069,996 | 2/1937 | Carleton et al. ............ 89/1.5 B |
| 4,168,046 | 9/1979 | Hasquenoph et al. ........ 244/137 A |
| 4,182,502 | 1/1980 | Hasquenoph et al. ........ 244/137 A |

FOREIGN PATENT DOCUMENTS 495329 11/1938 United Kingdom .............. 89/1.5 H

Primary Examiner—Charles E. Frankfort
Attorney, Agent, or Firm—William A. Drucker

[57] ABSTRACT

Device for carrying under aircraft multiple loads disposed at variable distances between centers, the modification of the distance between centers being obtained by rotating load supports about longitudinal axes by means of bearings provided in the frame structure of the carrier device. Each load support may be rigid with circular sets of teeth engaged by matching teeth formed on arms fulcrumed by means of eccentric pins on the frame structure and controlled for a same load support by cam device rigid with a common shaft.

10 Claims, 12 Drawing Figures

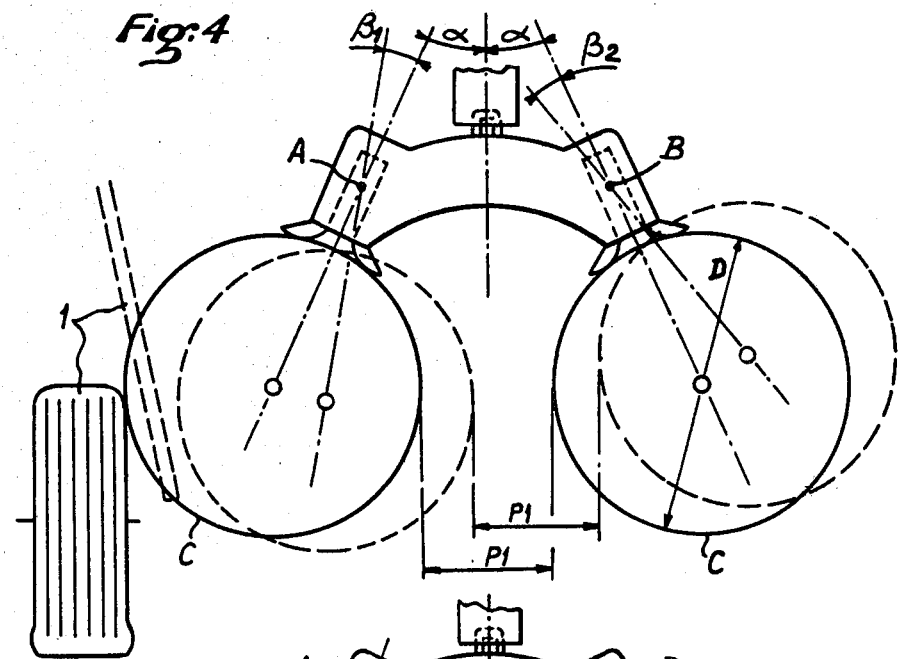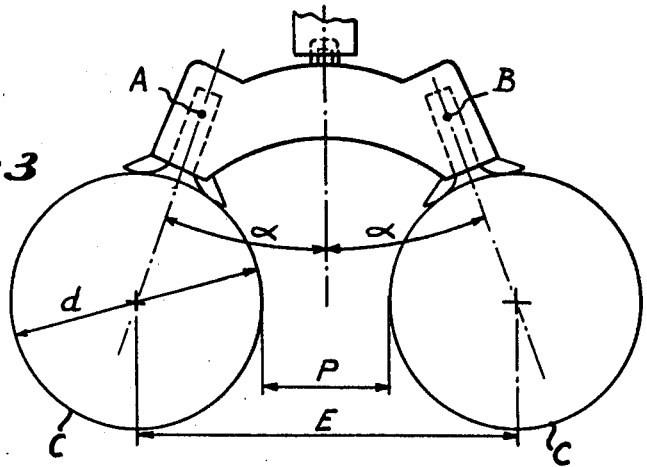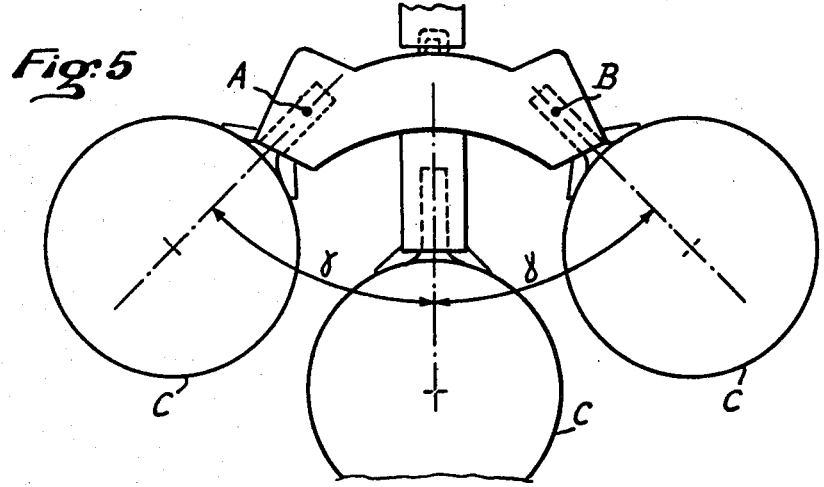

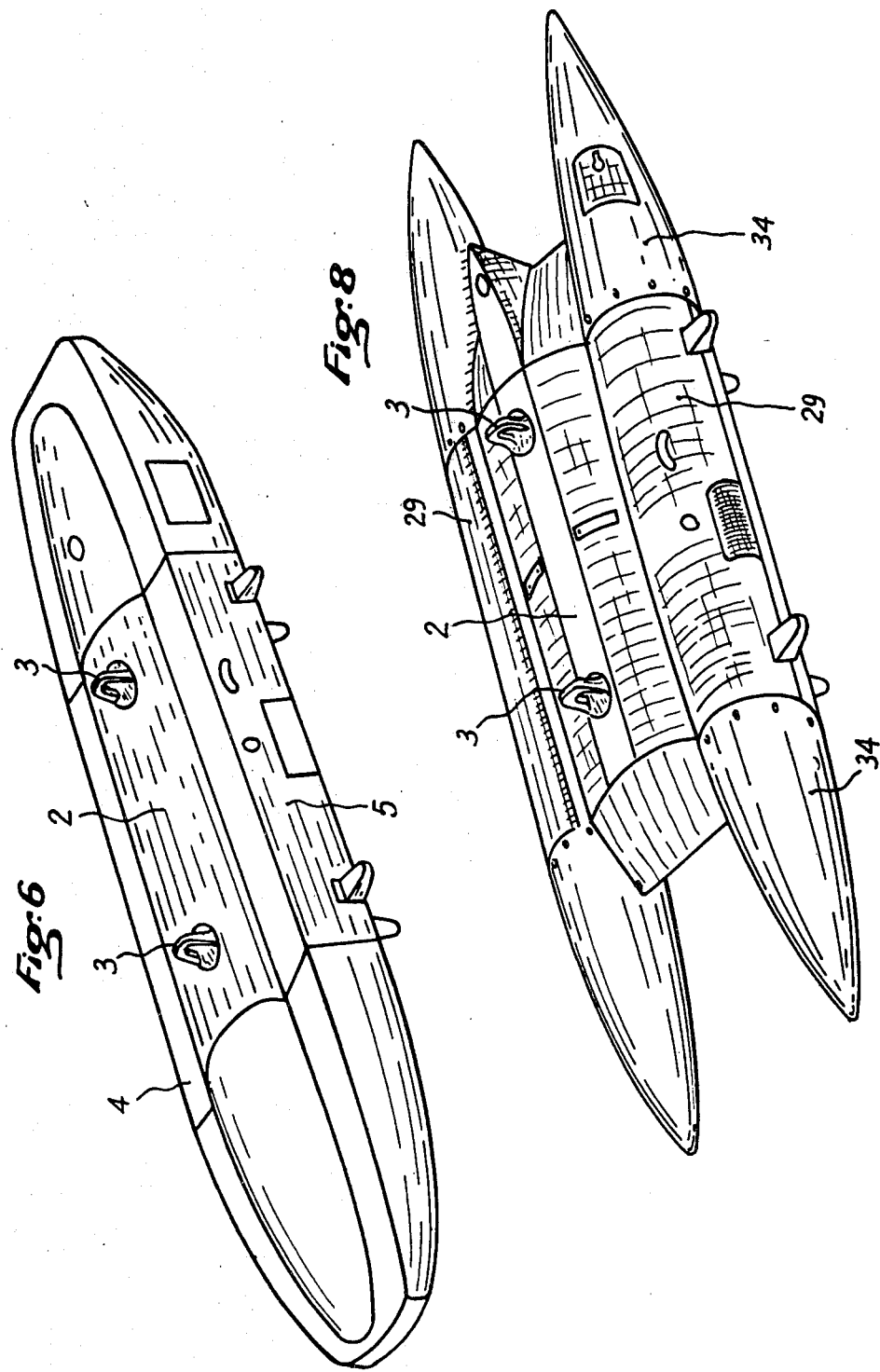

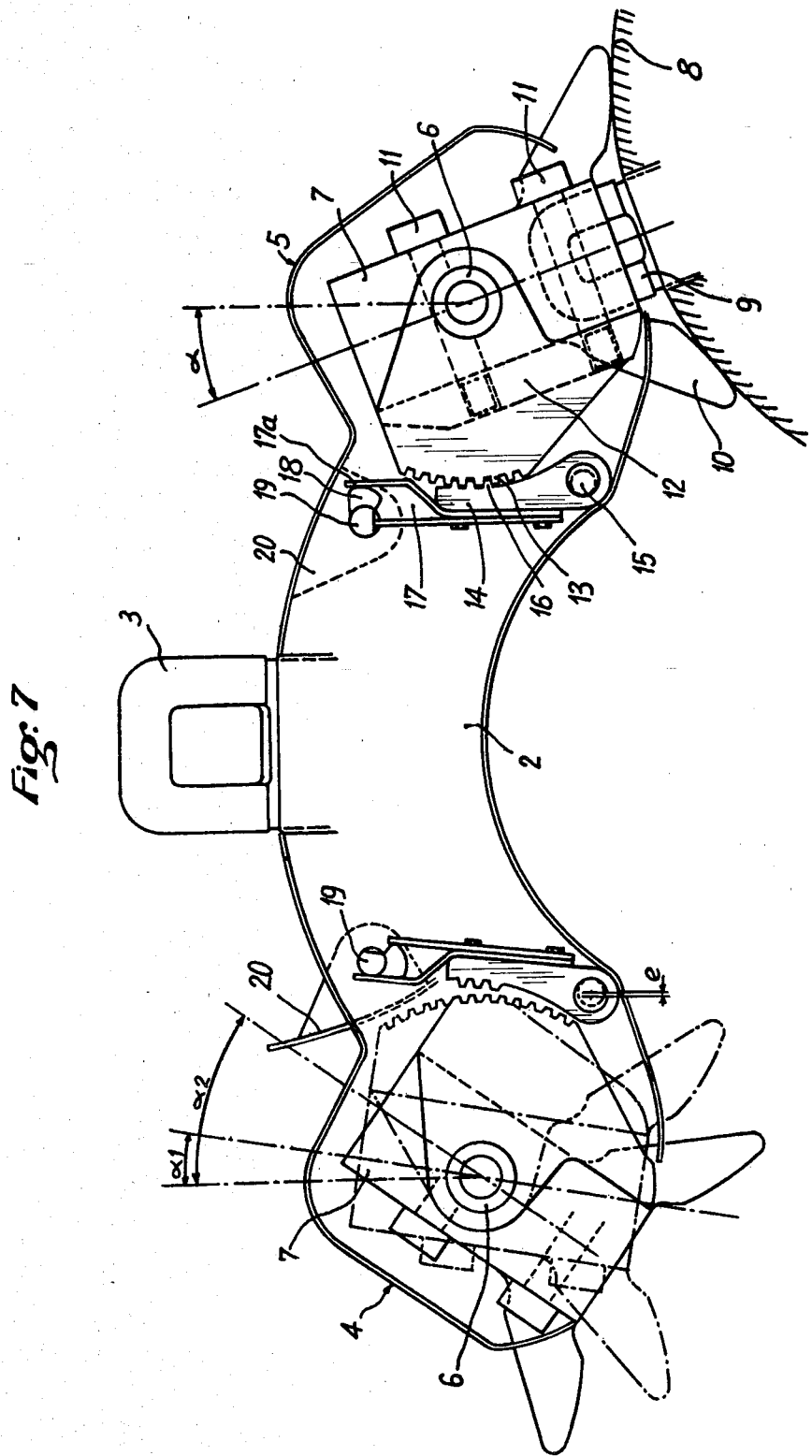

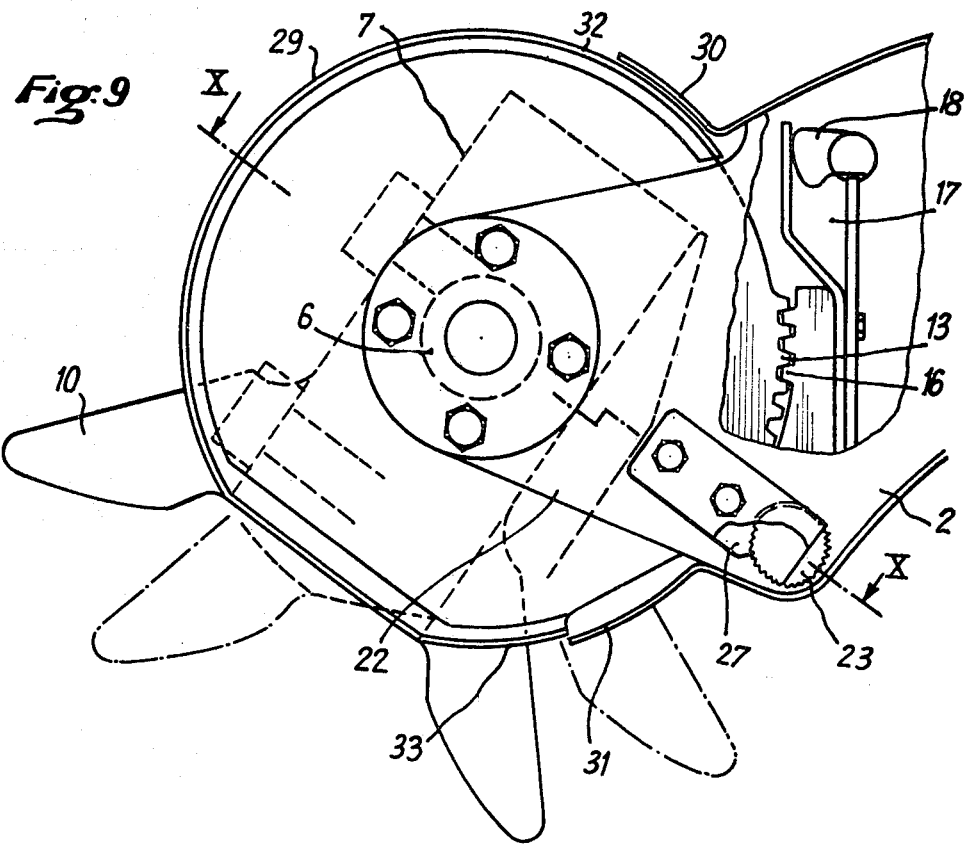
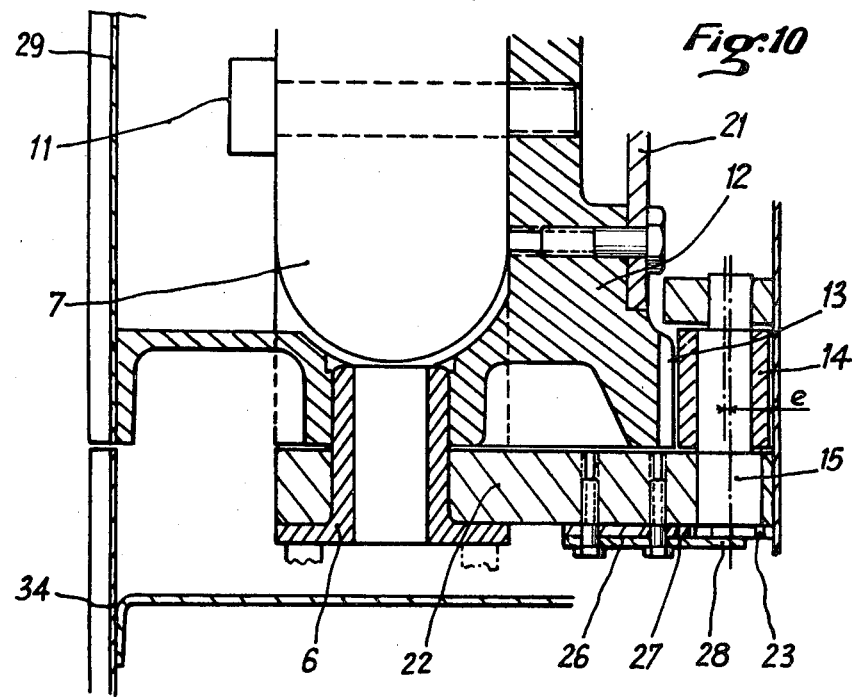

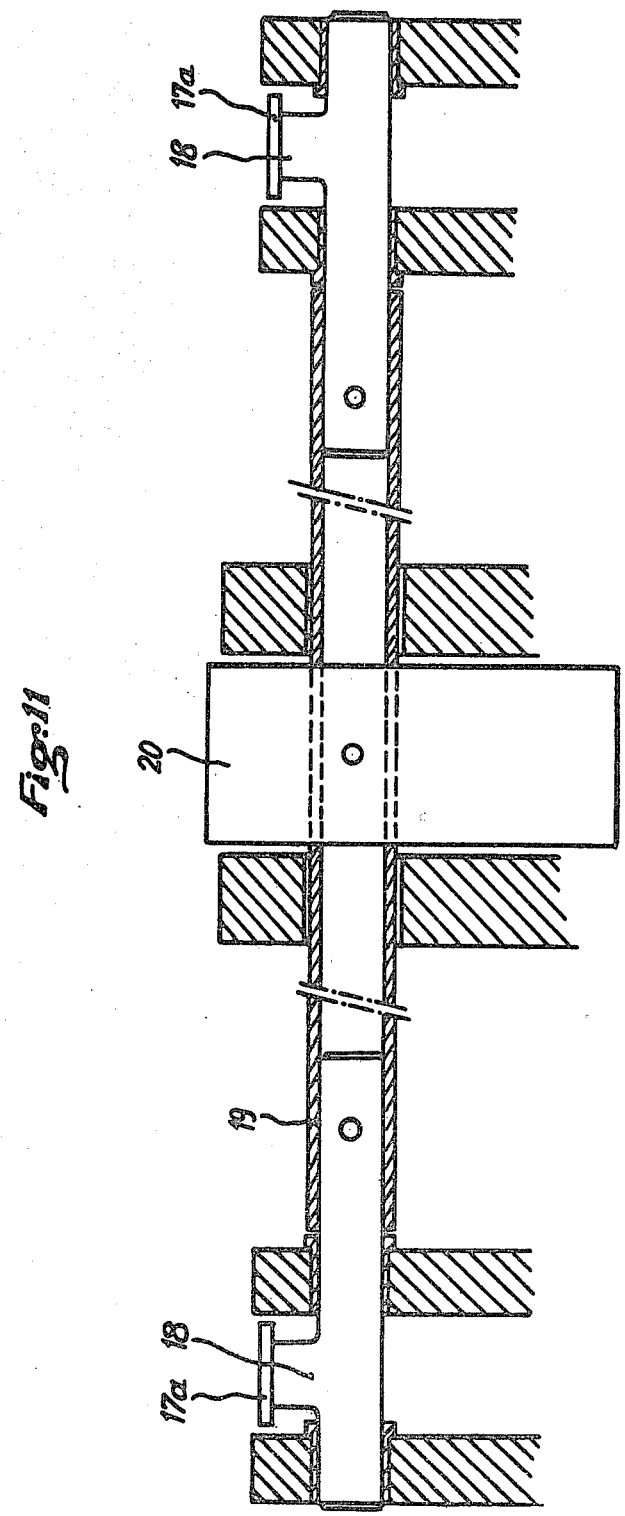

DEVICE FOR SUSPENDING UNDER AIRCRAFT MISCELLANEOUS LOADS WITH VARIABLE DISTANCE BETWEEN CENTERS

BACKGROUND OF THE INVENTION

1. Field of the Invention

The present invention relates to means for suspending loads under aircraft and has specific reference to an improved device of this character which is capable of carrying a plurality of loads, instead of a single load, with variable distances between centres.

2. Description of the Prior Art

Devices usually referred to as "adapters" for suspending miscellaneous loads under aircrafts are already known in the art. These devices are capable of carrying several loads under suspension posts provided for this purpose on certain aircraft types, each unit load being if desired lighter than the single load while having considerable overall dimensions.

As a rule, these so-called "adapters" are provided with two or more load supports disposed in parallel relationship, as shown diagrammatically in the explanatory FIGS. 1 and 2 of the accompanying drawings: When these supports are of the fixed type as shown in FIG. 1, the distance between centres E of loads C or C' remains unchanged irrespective of the load diameter, and therefore the aerodynamic drag produced by the assembly is not the optimal one in all cases. On the other hand, these adapters can be used at different aircraft locations. Some of them may be located relatively close to aircraft elements of which the overall dimensions, for example in the case of a landing gear in its operative position, may prevent or at least interfere with the exploitation of the full capacits of a standard adapter, as illustrated in FIG. 2. The landing carriage shown diagrammatically at 1 in this Figure obviously interferes with the load C having a diameter D, so that only a load C' having a diameter d can be carried by the device.

SUMMARY OF THE INVENTION

It is the primary object of the present invention to provide a device so designed that the distance between centres of the loads can be selected at will as a function of the load diameter and that, if necessary, the load assembly can be shifted laterally to permit for example the lowering of the landing gear. The principle on which the present invention is based is illustrated diagrammatically in FIGS. 3 to 5 of the accompanying drawings.

The variation in the distance between centres may be obtained according to the present invention by rotating the lateral load supports about one or two longitudinal axes such as A and B, as shown diagrammatically in FIGS. 3, 4 and 5. It is obvious that by rotating the load supports about these axes A and B it is possible to select the angle $\alpha$ of the median plane of the assembly comprising one load and its support with respect to the median plane of the suspension or carrier device, so that the distance between centres E of loads C (FIG. 3) and the gap P left therebetween can be given the desired value. Considering the diameter d of these loads, this gap P determines the front aerodynamic drag developed by this assembly, which can thus be minimized.

This optimum gap P can be maintained even in the presence of the landing gear 1 by causing an asymmetrical rotation $\beta 1$ and $\beta 2$ of the supports, as illustrated in FIG. 4, this rotation being if desired also subordinate to the diameter D of the loads suspended under the aircraft.

Besides, by providing a sufficient spacing between the lateral supports, through an angular movement $\gamma$ an intermediate support as illustrated in FIG. 5 may be fitted if desired.

As a rule, these load supports consist of ejector-type release means capable of imparting to the jettisoning load an initial or starting speed which adds itself to gravity. Moreover, by rotating the lateral load supports it is possible to select the obliqueness of the initial speed which is consistent with a proper trajectory of the loads in relation to each other and to the aircraft.

Furthermore, conditions of use or operation may be such that constructional simplicity becomes preponderant over the possibility of obtaining an accurate optimum gap between the loads. In this case, the axes of rotation of the loads may be selected to provide only two distances between the load centres i.e. a relatively reduced distance between centres for suspending two loads and another relatively broader distance between centres when it is required to carry a third load by fitting an additional median detachable support.

In all cases, an angular locking device with play take-up means may be provided, after selecting of course the proper lateral orientation of the load supports or carriers.

Now the specific features characterizing the devices of this invention will be described more in detail with reference to FIGS. 6 to 12 of the accompanying drawings.

BRIEF DESCRIPTION OF THE DRAWINGS

FIGS. 3 to 5 are adapters and in FIGS. 1 and 2 diagrammatically illustrating the principle on which the present invention is based;

FIG. 6 is a diagrammatic perspective view of a load carrier device equipped with fixed fairings;

FIG. 7 is a cross sectional view of the device, showing in the left-hand portion one of the bearing and the locking means in the release or free position, and in the right-hand portion one of the bearings in the locking position;

FIG. 8 is a diagrammatic perspective view of a carrier device with revolving fairings;

FIG. 9 is a cross section showing a nacelle with revolving fairing;

FIG. 10 is a fragmentary longitudinal section taken along the line X—X of FIG. 9, showing one of the bearings permitting the simultaneous rotation of a load support and of the fairing associated therewith;

FIG. 11 is a diagrammatic view showing the simultaneous control of the two locking devices associated with a same load support.

DESCRIPTION OF THE PREFERRED EMBODIMENTS

Figure 1:
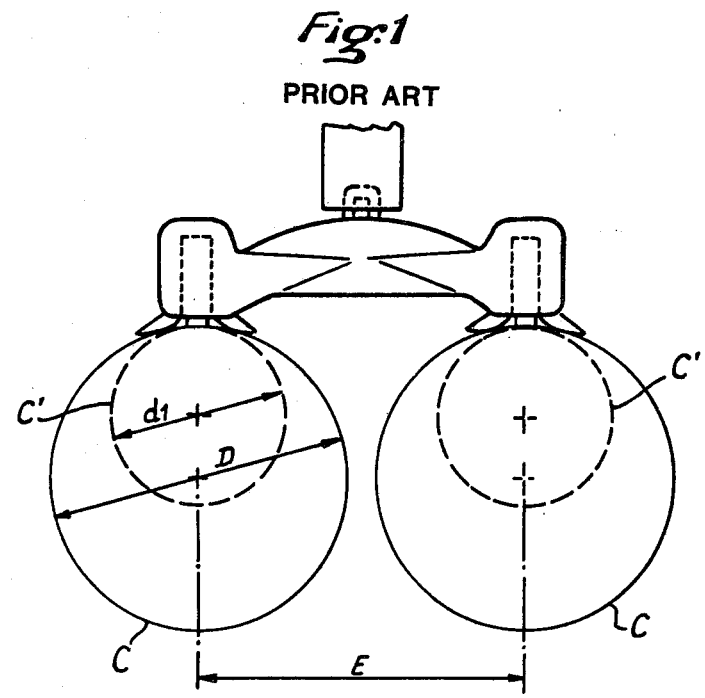
FIGS. 1 and 2 are diagrams of prior art adapters.
Figure 2:
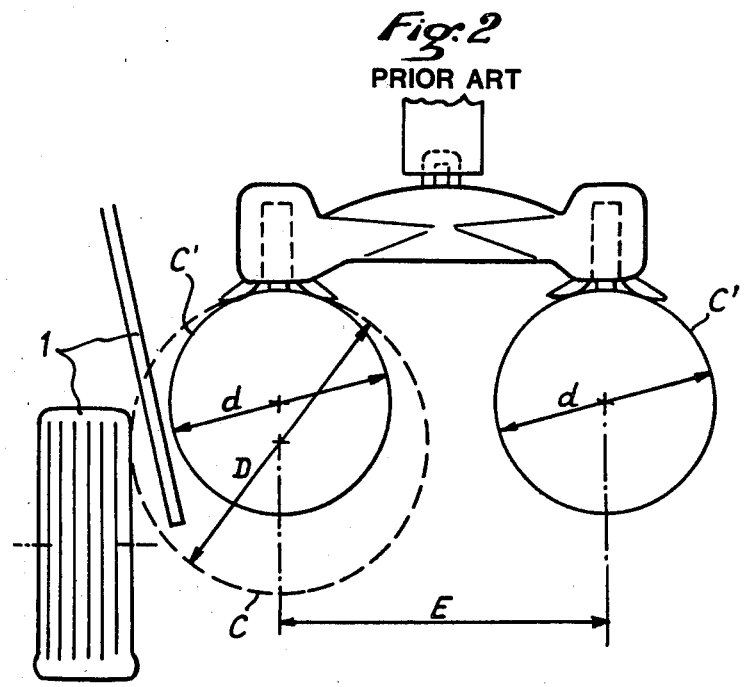

In FIG. 6, the reference numeral 2 designates the central frame structure of the device, with two rings 3 for suspending the load from the aircraft post provided for this purpose, 4 and 5 designating the two lateral nacelles rigid with said frame structure and wherein the load supports can be oriented laterally, as will be explained presently.

In FIG. 7, the same elements 2, 3, 4 and 5 are also shown but in cross-sectional view, and the reference numeral 6 designates the bearings permitting the rotation of the load supports 7, the load being shown at 8 with one of its anchor rings 9 suspended from and wedged against the bearing members 10 of the load support, in a manner not described herein since it is well known and conventional in the art.

Each load support 7 is fastened at either end to sturdy members 12 by means of screw-threaded elements 11 engaging its usual fixing means. These members 12 comprise a toothed segment 13 centered to bearing 6. There is also shown at 14 an arm fulcrumed to a pin 15 having a slight throw e in relation to its mounting axis (see FIGS. 7 and 10), to permit an accurate positioning of said arm 14.

This arm 14 comprises a set of teeth 16 matching those of segment 13 so that the teeth of these two members 13, 14 engage each other by their sides when actuated by means of a cam 18. The reference numeral 17 designate a strap attached to arm 14 and adapted to have its two prongs moved by cam 18 either in the direction to cause the mutual engagement of teeth 13 and 16, as shown in the right-hand portion of FIG. 7, or in the direction to disengage these teeth, as shown in the left-hand portion of the same Figure. The cams 18 located at the two ends of a same load support 12 are pivoted to a common fulcrum pin 19 and adapted to be actuated simultaneously through the medium of a radial blade 20 rigidly secured to the same pin 19. In the teeth engaging position the blade 20 is retracted to a position in which its outer contour is flush with the contour of the frame structure 2, as illustrated in the right-hand position of FIG. 7. It will be seen that the side 17a of strap 17 has a flexibility sufficient on the one hand to permit the mutual engagement, without play, of teeth 13 and 16, and on the other hand to provide an over-centre position of cam 19 in order to impart the necessary stability to the device, or in other words to cause in the gear-engaging position a reaction between the side 17a of cam 18 beyond the cam axis so as to urge the latter to its endmost position corresponding to this gear engagement.

The assembly shown in FIG. 7 comprises nacelles provided with fixed fairings 4, 5 in which load supports 7 are adapted to pivot in order to assume various lateral positions such as α, α1, α2. These fairings have substantially the envelope form of the possible positions of load supports 7 and of the standard accessories rigid therewith.

In FIG. 8, the lateral nacelles 29 are cylindrical and formed with fore and aft ogives 34, so that the modified structure illustrated in FIG. 9, with a cyindrical fairing 29 for the load support 7 which is rigid with said support and adapted to rotate bodily therewith about the bearing 6. In FIG. 9, the central frame structure 2 comprises members 22 adapted to receive the bearings 6. The elements 30 and 31 corresponding in shape to the cylindrical fairings and rigid with said frame structure 2 are adapted to cover cylindrical portions 32 and 33 of fairing 29 during the movements thereof.

The preferably cylindrical configuration of this fairing 29 simplifies greatly its construction while facilitating the aerodynamic merging thereof with the fixed fore and aft ogives 34 (FIG. 8).

FIG. 10 illustrates, in addition to the above-mentioned components, a tie member 21 interconnecting the fore and aft members 12 of a same load support 7. With this tie member 21 it is possible to remove the load support proper while preventing any relative angular shift between the fore and aft members 12 associated with said support. The reference numeral 23 designates the splined head of the eccentric pin 15 locked in the selected position by the assembly 26 secured to member 22 and comprising on the one hand a plate 27 formed with notches matching with, and adapted to engage, the splines of said head 23, and on the other hand a holding plate 28 preventing the backward movement of said eccentric pin 15.

FIG. 11 illustrates diagrammatically the means for operatively coupling the fore and aft cams 18 in connection with a common load support by means of a common rotary shaft 19. The reference numeral 20 designates the blade controlling both cams 18 actuating simultaneously the sides 17a of straps 17 shown in FIG. 7.

Figure 12:
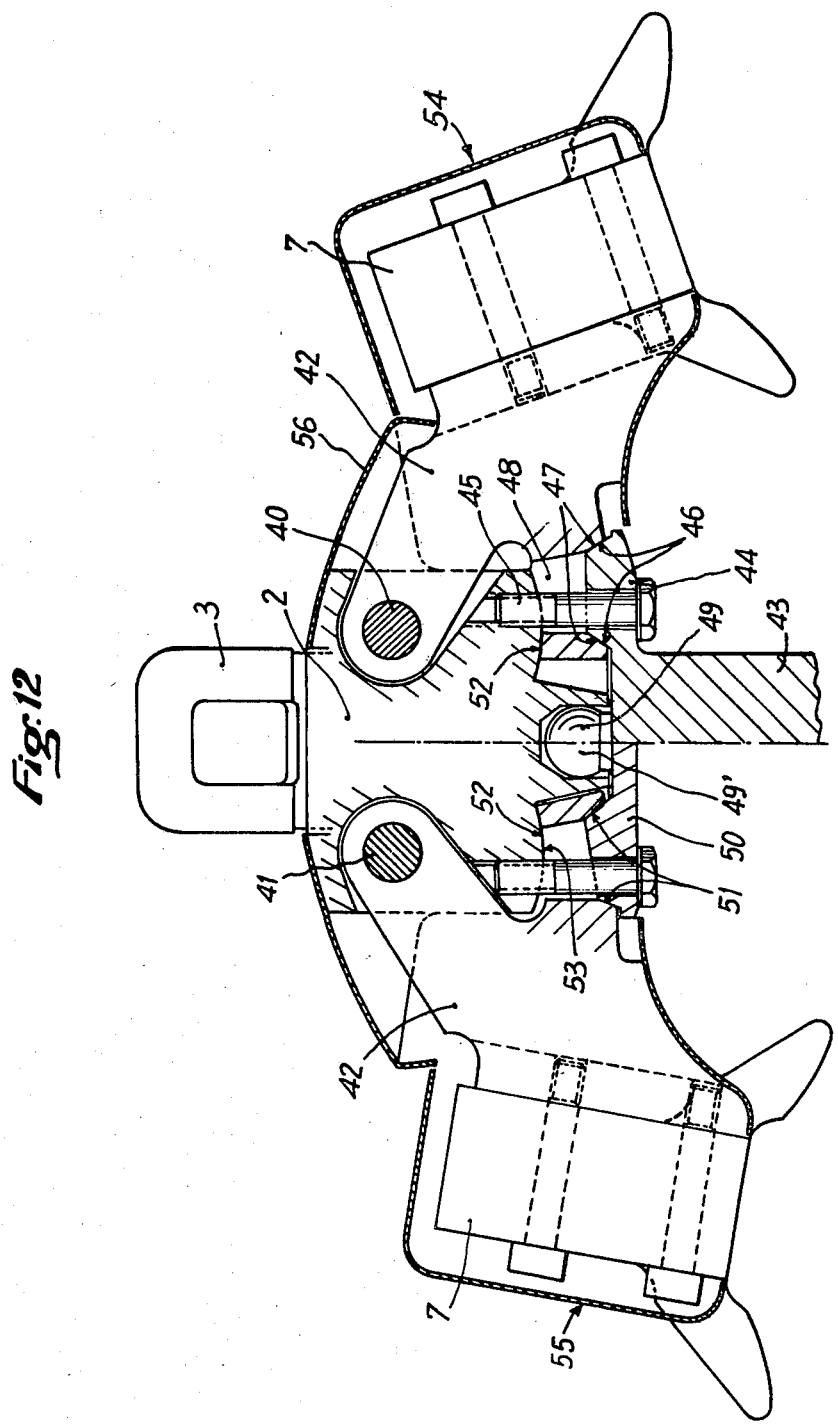
FIG. 12 is a cross section showing a simplified two-position device for carrying a third load between two lateral loads set in their outermost positions, as shown in the right-hand portion of the Figure; the position corresponding to the minimum distance between the centres of the two loads is shown in the left-hand portion of the same Figure.

FIG. 12 shows the intermediate frame structure 2 rigid with one of the suspension rings 3. Pivotally mounted on fixed pins 40, 41 are the two members 42 on which the load supports 7 are secured. A detachable central support 43 is formed with lateral projections or lugs 44 for fixing same to the frame structure 2 by means of screws 45. A trapezoidal-sectioned key 46 is an integral portion of the central support 43 and adapted to accomodate the complementary hollow portion 47 formed at the base of the pivoting member 42.

An elongated hole 48 is formed in the pivoting member 42 to permit the passage of the corresponding fastening screw 45. One of the ball-and-socket joints provided between the support 43 and central frame structure 2 is shown at 49. A coupling member 50 is substituted for this support 43 when it is not contemplated to carry an intermediate or central load, so that the pivoting members 42 are brought nearer to each other. This coupling member 50 is provided with centering balls 49' similar to those of the ball-and-socket joints 49 of support 43 and comprises trapezoidal-sectioned keys 51 similar to the keys 46 but inclined to take due account of the rotation of member 42 with respect to the position shown in the right hand portion of FIG. 12. Cylindrical surfaces 52 centered to axes 40 or 41 are provided on said pivoting members 42 for cooperation with the cylindrical counter-parts 53 of frame structure 2, irrespective of the position of said pivoting members 42.

The load supports 7 comprise fairings 54 and 55 rigid therewith which merge either with the frame structure 2 proper, or with the fairing 56 thereof, as shown in the Figure.

The devices described hereinabove are used as follows:

If the fairings of the load supports are attached as shown in FIGS. 6 and 7, the toothed segments 13 are released by raising the blade 20 as shown in the left-hand portion of FIG. 7, so that the load supports 7 can be set in the lateral angular position corresponding to the specific mode of operation contemplated. As a consequence of the withdrawal of the control blade 20 to the retracted position shown in the right-hand portion of FIG. 7, the teeth 16 of arms 14 engage the teeth 13, due to the action exerted by cams 18 on the sides 17a of straps 17. The relative flexibility of these sides is such that a contact without any backlash is obtained between the teeth sides, and that the cams 18 can be moved to a position such that the reaction exerted by the sides 17a on said cams oversteps the axis of shaft 19, thus creating a moment in the direction to hold the blade 20 in its retracted position. In order to avoid unduly tight tolerances in the positioning of the various component elements, means in the form of a eccentric pin 15, or any other suitable means, are provided to permit an accurate adjustment of the relative positions of teeth 13 and 16. Thus, an accurate and playless positioning is obtained.

Should the fairings 29 be rigid with the load supports, as illustrated in FIGS. 8, 9 and 10, the mode of operation would be the same as in the preceding case. In this specific case, means for locking the eccentric pins 15, which are applicable to the preceding case, can be used, this also applying to the coupling ties 21 of end members 12 which enable the load supports 7 to be removed without altering the adjustment or setting of the device.

Reference marks (not shown) may be provided for avoiding any trial and error for finding the desired positioning of the load supports before locking them.

In the arrangement illustrated in FIG. 12, in which only two positions are contemplated, the device is provided according to cases with either the intermediate support 43 or the coupling member 50. In the first case, the load supports 7 and their fairings 54, 55 are spaced as widely as possible apart by pivoting them about the axes 40, as illustrated in the right-hand portion of the Figure, and the central support 43 is raised by introducing the ball members 49 into the corresponding sockets of support 2, so that the pivoting members 42 can assume positions controlled by the presence of the trapezoidal keys 46. Then, by inserting and tightening the screws 45 the side faces of the trapezodial elements are caused to engage each other, thus locking the load supports in position, without any play. Under these conditions, three loads can be carried side by side. In the second case it is assumed that only two loads are to be suspended from the aircraft and therefore the central support 43 is removed, and after moving the lateral load supports 7 toward each other as shown in the left-hand portion of FIG. 1, the device is locked as in the preceding case by utilizing the distance piece 50 for this purpose.

What I claim is:

1. A device for carrying under aircraft multiple loads disposed at variable distances between centers, which comprises:
   (a) a central frame structure equipped at its upper face with suspension members adapted to co-act with hook means of the aircraft,
   (b) a pair of lateral hollow nacelles carried on each side of said central frame structure,
   (c) load supports disposed within each lateral nacelle and presenting load suspension means registering with an aperture of the corresponding nacelle, said load supports being mounted in bearings carried by each nacelle to rotate about the longitudinal axis of said nacelle, and
   (d) control means associated to said load supports to cause the load supports disposed within each nacelle to rotate about the longitudinal axis of said nacelle, thus ensuring a variation in the distances between centers of the loads suspended to the load supports of one nacelle and to the load supports of the other nacelle.

2. Device according to claim 1, wherein the rotary load supports comprise locking means consisting of gear teeth associated with play take-up means.

3. Device according to claim 2, wherein a set of gear teeth is rigid with each load support and consists of a toothed segment while another set of gear teeth is matching therewith and consists of teeth formed on a pivoted arm.

4. Device according to claim 3 wherein each load support is mounted in two bearings and presents two sets of gear teeth, two pivoted arms each presenting a set of gear teeth being provided to match with the sets of gear teeth of the load support and said pivoted arms being responsive simultaneously to a pair of cams rigid with a common shaft.

5. Device according to claim 1, wherein the axis of rotation of each load support is coincident with the axis of a case rigid with said load support.

6. Device according to claim 5, wherein each rotary case rigid with a load support is of cylindrical configuration.

7. Device according to claim 1, wherein said load supports are secured to pivoting members of which the lateral relative spacing is determined by the use of an intermediate load support.

8. Device according to claim 7, wherein the intermediate load support comprises centering ball-and-socket joints and trapezoidal-sectioned keys to lock said load supports in position and hold them therein without play.

9. Device according to claim 1, wherein said load supports are secured to pivoting members of which the lateral relative spacing is determined by the use of a detachable distance-piece.

10. Device according to claim 9, wherein the detachable distance-piece comprises centrering ball-and-socket joints and trapezoidal-sectioned keys to lock said load supports in position and hold them therein without play.

* * * * *